US012585730B2

(12) United States Patent
Dubin

(10) Patent No.:  US 12,585,730 B2
(45) Date of Patent:  Mar. 24, 2026

(54) MANAGING MACHINE LEARNING MODELS

(71) Applicant: OPSWAT Inc., Tampa, FL (US)

(72) Inventor: Ran Dubin, Habostan (IL)

(73) Assignee: OPSWAT Inc., Tampa, FL (US)

( * ) Notice: Subject to any disclaimer, the term of this patent is extended or adjusted under 35 U.S.C. 154(b) by 958 days.

(21) Appl. No.: 17/806,401

(22) Filed: Jun. 10, 2022

(65) Prior Publication Data

US 2023/0401288 A1     Dec. 14, 2023

(51) Int. Cl.
| | |
|---|---|
| *G06F 18/21* | (2023.01) |
| *G06F 8/60* | (2018.01) |
| *G06F 11/34* | (2006.01) |
| *G06F 18/23* | (2023.01) |
| *G06N 3/0895* | (2023.01) |

(Continued)

(52) U.S. Cl.
CPC ............ *G06F 18/2178* (2023.01); *G06F 8/60* (2013.01); *G06F 11/3495* (2013.01); *G06F 18/217* (2023.01); *G06F 18/23* (2023.01); *G06N 3/0895* (2023.01); *G06N 3/091* (2023.01); *G06N 20/00* (2019.01)

(58) Field of Classification Search
CPC .. G06F 18/2178; G06F 18/60; G06F 11/3496; G06F 18/24; G06F 18/217; G06F 18/23; G06F 18/22; G06F 21/56; G06N 20/00; G06N 20/20; G06N 3/045; G06N 3/0895; G06N 3/091
See application file for complete search history.

(56) References Cited

U.S. PATENT DOCUMENTS

| | | | | |
|---|---|---|---|---|
| 7,941,382 B2 * | 5/2011 | Stokes | ................. | G06F 15/16 |
| | | | | 706/20 |
| 8,533,224 B2 * | 9/2013 | Lin | ....................... | G06N 20/00 |
| | | | | 707/777 |
| 10,148,677 B2 * | 12/2018 | Muddu | ................. | H04L 43/045 |

(Continued)

OTHER PUBLICATIONS

Zhou, Yan, and Sally Goldman. "Democratic co-learning." 16th IEEE International Conference on Tools with Artificial Intelligence. IEEE, 2004. (Year: 2004).*

(Continued)

*Primary Examiner* — Andrew L Tank
(74) *Attorney, Agent, or Firm* — MLO, a professional corp.

(57)                ABSTRACT

A method includes receiving files. Deployed models analyze the files to create results with corresponding data. The results identify suspicious files. The system calculates ranked results by ranking the results according to a confidence level, and clustered groups by clustering the results based on similar data. The system calculates classes by correlating the ranked results to the clustered groups. The classes indicate accurate results and inaccurate results. The system retrains the deployed models having the class indicating inaccurate results with new training sets to create retrained models. The system validates the retrained models when the retrained models identify one or more suspicious files from the receiving. The system compares the classes of the deployed models to new classes of the retrained models. The computerized system deploys the retrained models when the new classes of the retrained models indicate accurate results greater than the classes of the deployed models.

20 Claims, 9 Drawing Sheets

(51) Int. Cl.
     *G06N 3/091*          (2023.01)
     *G06N 20/00*          (2019.01)

(56) References Cited

U.S. PATENT DOCUMENTS

| | | | |
|---|---|---|---|
| 10,902,117 B1 | 1/2021 | Singh et al. | |
| 11,620,481 B2 * | 4/2023 | Givental | G06F 18/2433 |
| | | | 706/22 |
| 11,921,851 B1 * | 3/2024 | Vashisht | G06N 5/01 |
| 11,941,124 B2 * | 3/2024 | Briliauskas | G06F 21/566 |
| 12,174,915 B1 * | 12/2024 | Maeng | G06F 18/2178 |
| 2017/0032279 A1 * | 2/2017 | Miserendino | G06N 5/04 |
| 2018/0032915 A1 | 2/2018 | Nagaraju et al. | |
| 2018/0060580 A1 | 3/2018 | Zhao et al. | |
| 2018/0060759 A1 * | 3/2018 | Chu | G06N 20/00 |
| 2018/0068222 A1 * | 3/2018 | Brennan | G06N 5/022 |
| 2019/0102700 A1 * | 4/2019 | Babu | G06N 20/00 |
| 2019/0114539 A1 | 4/2019 | Chistyakov et al. | |
| 2019/0147371 A1 * | 5/2019 | Deo | G06N 20/20 |
| | | | 706/12 |
| 2019/0354810 A1 * | 11/2019 | Samel | G06F 18/2115 |
| 2021/0034960 A1 * | 2/2021 | Khapali | G06N 3/08 |
| 2021/0314333 A1 * | 10/2021 | Krisiloff | H04L 63/1416 |
| 2021/0406780 A1 * | 12/2021 | Lesner | G06F 18/285 |
| 2022/0067573 A1 * | 3/2022 | Munguia Tapia | G06F 11/3495 |
| 2022/0101186 A1 * | 3/2022 | Sharma Mittal | G06V 10/751 |
| 2022/0138504 A1 * | 5/2022 | Fathi Moghadam | G06N 20/20 |
| | | | 706/12 |
| 2022/0172100 A1 * | 6/2022 | Balasubramanian | |
| | | | G06T 7/0008 |
| 2022/0414401 A1 * | 12/2022 | Saillet | G06F 18/214 |
| 2023/0084761 A1 * | 3/2023 | Koopman, Jr. | G06N 20/00 |
| | | | 706/12 |
| 2023/0126294 A1 * | 4/2023 | Tabet | G06N 3/08 |
| | | | 706/12 |
| 2023/0229890 A1 * | 7/2023 | Kou | G06N 3/08 |
| | | | 706/25 |

OTHER PUBLICATIONS

Mao, C. H., Lee, H. M., Parikh, D., Chen, T., & Huang, S. Y. (Mar. 2009). Semi-supervised co-training and active learning based approach for multi-view intrusion detection. In Proceedings of the 2009 ACM symposium on Applied Computing (pp. 2042-2048). ( Year: 2009).*

Narayanan, Annamalai, et al. "Context-aware, adaptive, and scalable android malware detection through online learning." IEEE Transactions on Emerging Topics in Computational Intelligence 1.3 (2017): 157-175. (Year: 2017).*

Xu, K., Li, Y., Deng, R., Chen, K., & Xu, J. (Jun. 2019). Droidevolver: Self-evolving android malware detection system. In 2019 IEEE European Symposium on Security and Privacy (EuroS&P) (pp. 47-62). IEEE. (Year: 2019).*

Li, Caizi, et al. "Self-ensembling co-training framework for semi-supervised COVID-19 CT segmentation." IEEE Journal of Biomedical and Health Informatics 25.11 (2021): 4140-4151. (Year: 2021).*

"Combating Malware Innovation With Innovation", SNDBOX Technology Ltd 2018, 3 pgs, www.sndbox.com.

Kumar, Mohit., "SNDBOX: AI-Powered Online Automated Malware Analysis Platform", Dec. 5, 2018, 12 pgs, The Hacker News. https://thehackernews.com/2018/12/sndbox-malware-analysis-tool.html.

* cited by examiner

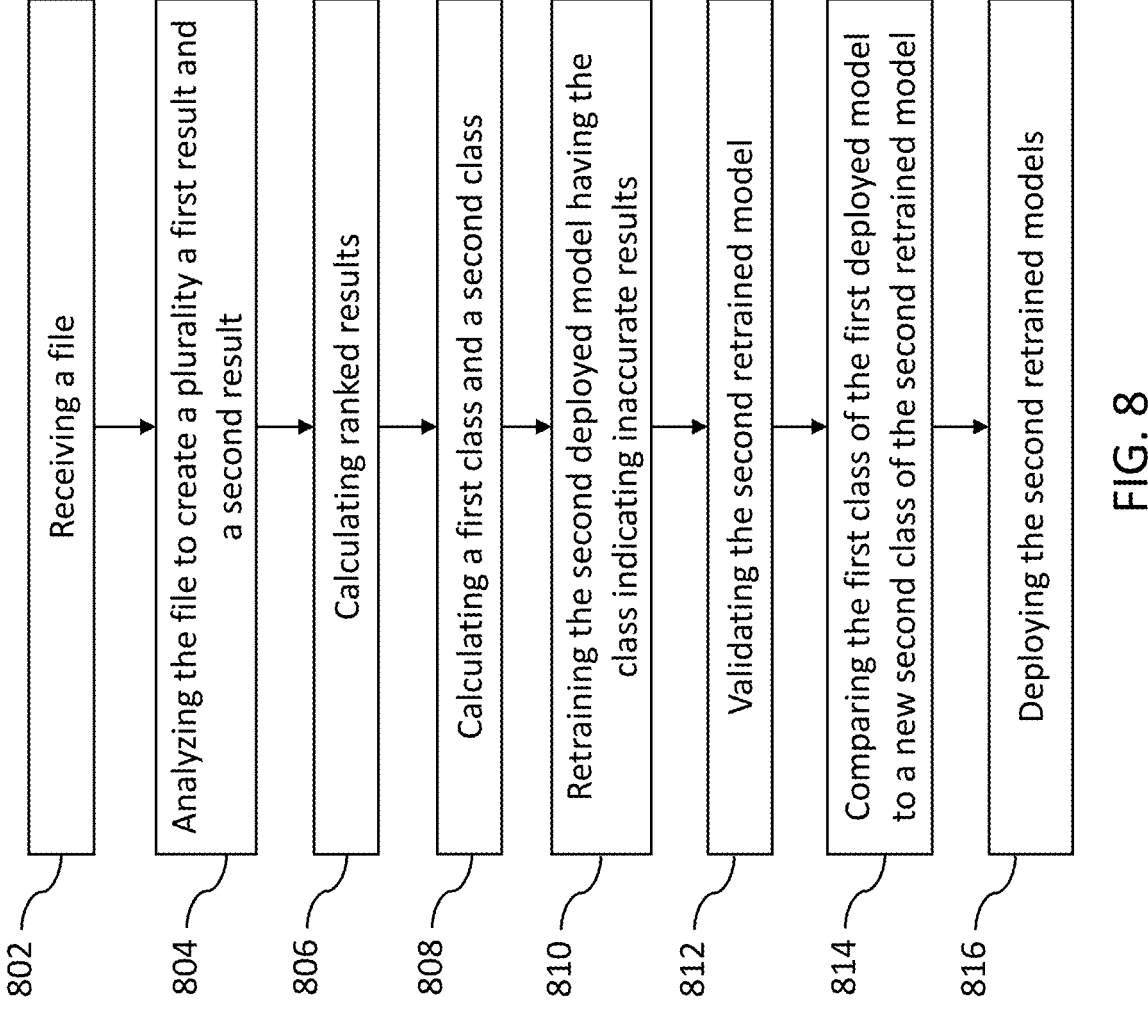

800

802 — Receiving a file

804 — Analyzing the file to create a plurality a first result and a second result 806 — Calculating ranked results 808 — Calculating a first class and a second class 810 — Retraining the second deployed model having the class indicating inaccurate results 812 — Validating the second retrained model 814 — Comparing the first class of the first deployed model to a new second class of the second retrained model 816 — Deploying the second retrained models

FIG. 8

MANAGING MACHINE LEARNING MODELS

BACKGROUND

Deployed machine learning models for detecting malware and computer security risks can make accurate predictions for a time period. Over time, the predictions made by the machine learning model are no longer relevant to the new time period because new threats and attacks from malware are consistently evolving. This phenomenon is known as drift. Put another way, in drift, the statistical properties of the target variable, which the model is trying to predict, change over time in unforeseen ways and the predictions become less accurate as time passes.

Due to this phenomenon, the deployed machine learning model becomes unstable or unreliable, and the predictions become erroneous with time. Hence, it is necessary to retrain and validate the deployed machine learning model while minimizing downtime for the newly retrained machine learning model to be deployed in a production environment. In doing so, the security detection can be improved and adapted to the changing attack landscape.

SUMMARY

Some embodiments involve a method of receiving, by a plurality of deployed models of a computerized system, a plurality of files to an enterprise system in a communication system. The plurality of deployed models analyzes the plurality of files to create a plurality of results with corresponding data. Each result of the plurality of results is associated with one deployed model of the plurality of deployed models. The plurality of results identifies one or more suspicious files of the plurality of files. The computerized system calculates ranked results by ranking the plurality of results according to a confidence level, and clustered groups by clustering the plurality of results based on similar data. The computerized system calculates classes by correlating the ranked results to the clustered groups. The classes indicate accurate results and inaccurate results. The computerized system retrains the plurality of deployed models having the class indicating inaccurate results with new training sets to create a plurality of retrained models. The new training sets are based on the class and the corresponding data. The computerized system validates the plurality of retrained models have been retrained when the retrained models identify one or more suspicious files of the plurality of files from the receiving. The computerized system compares the classes of the plurality of deployed models to new classes of the plurality of retrained models. The new classes are determined by repeating the receiving, analyzing, and calculating for the plurality of retrained models. The computerized system deploys the plurality of retrained models when the new classes of the plurality of retrained models indicate accurate results greater than the classes of the plurality of deployed models.

Some embodiments involve a computerized system which includes a memory storing executable instructions and a processor, coupled to the memory, that performs a method by executing the instructions stored in the memory. The method includes receiving, by a plurality of deployed models of the computerized system, a plurality of files to an enterprise system in a communication system. The plurality of deployed models analyzes the plurality of files to create a plurality of results with corresponding data. Each result of the plurality of results is associated with one deployed model of the plurality of deployed models. The plurality of results identifies one or more suspicious files of the plurality of files. The processor calculates ranked results by ranking the plurality of results according to a confidence level, and clustered groups by clustering the plurality of results based on similar data. The processor calculates classes by correlating the ranked results to the clustered groups. The classes indicate accurate results and inaccurate results. The processor retrains the plurality of deployed models having the class indicating inaccurate results with new training sets to create a plurality of retrained models. The new training sets are based on the class and the corresponding data. The processor validates the plurality of retrained models have been retrained when the retrained models identify one or more suspicious files of the plurality of files from the receiving. The processor compares the classes of the plurality of deployed models to new classes of the plurality of retrained models. The new classes are determined by repeating the receiving, analyzing, and calculating for the plurality of retrained models. The processor deploys the plurality of retrained models when the new classes of the plurality of retrained models indicate accurate results greater than the classes of the plurality of deployed models.

Some embodiments involve a method of receiving by a first deployed model and a second deployed model of a computerized system, a file to an enterprise system in a communication system. The first deployed model and the second deployed model analyze the file to create a first result with corresponding data associated with the first deployed model and a second result with corresponding data associated with the second deployed model. The first result or the second result identifies the file as a suspicious file. The computerized system calculates ranked results by ranking the first result and the second result according to a confidence level. The computerized system calculates a first class associated with the first result and a second class associated with the second result. The first class indicates an accurate result and the second class indicates an inaccurate result. The computerized system retrains the second deployed model having the second class indicating inaccurate results with new training sets to create a second retrained model. The new training sets based on the second class and the corresponding data. The computerized system validates the second retrained model has been retrained when the second retrained model identifies the suspicious file from the receiving. The computerized system compares the first class of the first deployed model to a new second class of the second retrained model. The new second class is determined by repeating the receiving, analyzing, and calculating for the second retrained model. The computerized system deploys the second retrained model when the new second class of the second retrained model indicates the accurate result greater than the first class of the first deployed model.

BRIEF DESCRIPTION OF THE DRAWINGS

FIG. 8 is a flowchart of an example method for managing two machine learning models of a computerized system, in accordance with some embodiments.

DETAILED DESCRIPTION

Figure 1:
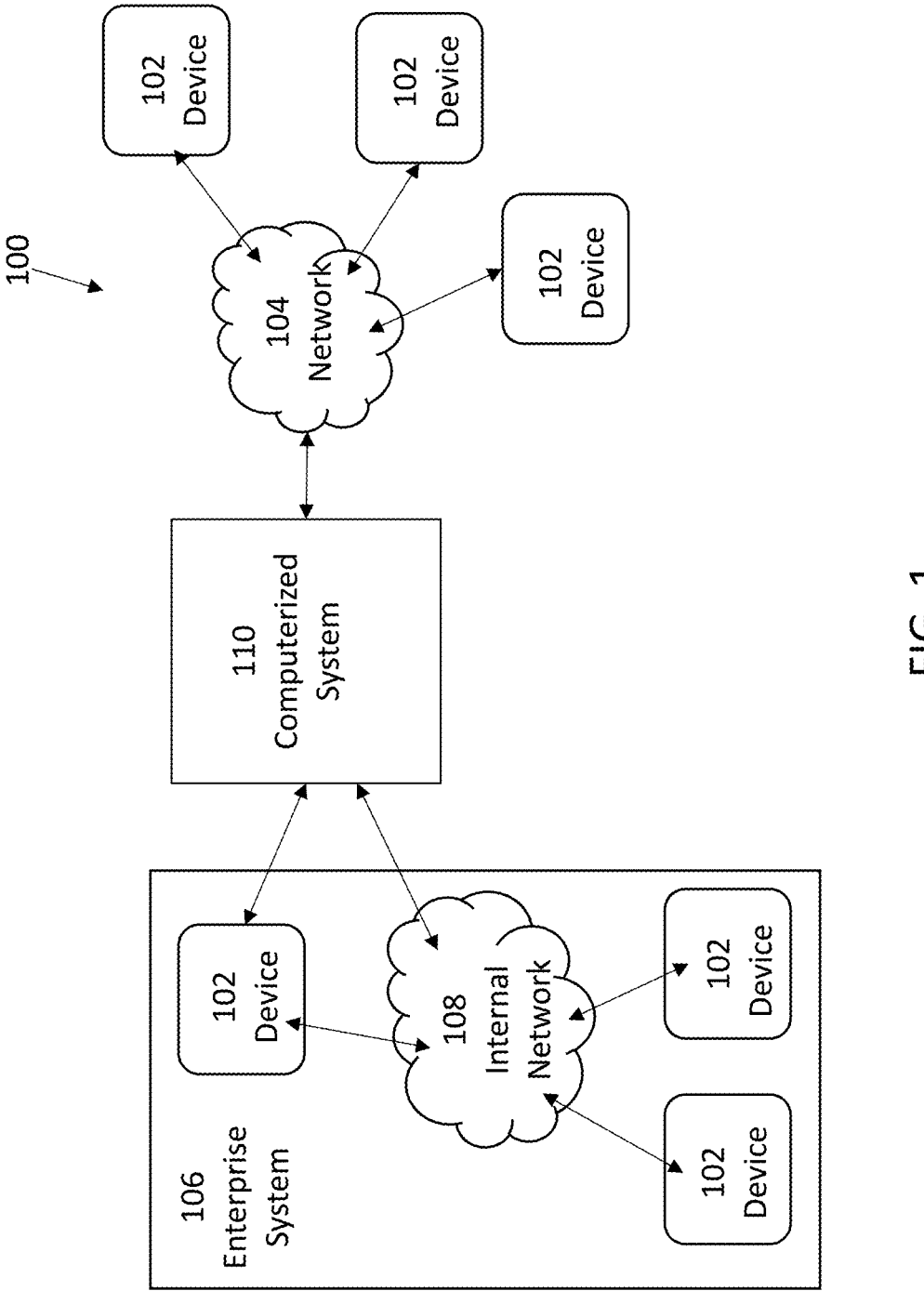
FIG. 1 is a schematic of an example communication system, in accordance with some embodiments.

The malware threat landscape is continuously changing. The present disclosure relates to methods and systems for managing machine learning models for detecting threats in files or items before they enter an enterprise system. The methods and systems include a framework of a plurality of deployed machine learning models (e.g., deployed models) used to detect threats where each deployed model analyzes the files from a different perspective such as file type or a feature of the file. In this way, the chance of detecting a threat may be increased since each deployed model scrutinizes the file in a different way. Any deployed models that fail to detect threats can be retrained on-the-fly based on new automatically created training sets that include the threats that were just failed to be detected (also called deficits). Accordingly, the plurality of deployed models is constantly updated in real-time with timely new data so the latest deficits per deployed model are added to the next integration of deployment. The model updates are needed to combat new vulnerabilities attack vectors that try to bypass the current deployed models. Since malware attacks evolve quickly and are very common, retraining and validating new models as fast as possible can protect an enterprise system from threats.

The methods and systems use specialized calculations to reduce the number of results by calculating ranked results, which is ranking the plurality of results from the deployed models according to a confidence level, and clustered groups by clustering the plurality of results from the deployed models based on similar data over a time period. The ranked results and the clustered groups are correlated, and classes are created indicating accurate results or inaccurate results based on false positives and false negatives. The creation of the classes is a way to summarize the results of a large number of files so a reviewer can review the summary— accurate results and inaccurate results—instead of the large number of files. This reduces the review time, the cost, and resources of the semi-supervised review.

In accordance with the embodiments herein, some or all of the deployed models may need to be retrained based on the results indicating inaccurate results. The new training sets are automatically created without human interaction based on the class and the corresponding data. The retrained models are validated and verified, and then the classes of the retrained models are compared to the classes of the deployed models. When the classes of the retrained models indicate accurate results greater than the classes of the deployed models, the retrained models are deployed in the production environment.

The retraining of the deployed models and the deployment of the retrained models into the production environment occurs while the plurality of deployed models is running in the production environment. This means that there is no downtime of the model going offline to be retrained and updated. This allows the deployment of the new retrained model to be seamless, on-the-fly, and in real-time with continuous integration and continuous deployment of the most current new data and new abilities to detect evasive malware and new vulnerabilities that were discovered from the deployment of the previous model.

FIG. 1 is a schematic of an example communication system 100, in accordance with some embodiments. Users communicate with each other using a variety of communication devices 102, such as personal computers, laptop computers, tablets, mobile phones, landline phones, smartwatches, smart cars, or the like, operated by a user. The devices 102 generally transmit and receive network traffic communications such as files, data, and emails, through a variety of paths, communication access systems or networks 104. The networks 104 may be the Internet, a variety of carriers for telephone services, third-party communication service systems, third-party application cloud systems, third-party customer cloud systems, cloud-based broker service systems (e.g., to facilitate integration of different communication services), on-premises enterprise systems, or other potential systems. In some embodiments, the communication system 100 includes an on premises enterprise system 106 which may be a computer, a group of computers, a server, a server farm, or a cloud computing system.

The enterprise system 106 may include an internal network 108 through which internal communication devices 102 communicate. A computerized system 110 may be part of the enterprise system 106 or outside of the enterprise system 106, and receives all network traffic communication, such as data or files transmitted to or within the enterprise system 106. In some embodiments, the computerized system 110 receives the files through the network 104, the internal networks 108 or directly from some of the devices 102. The files may be common document types, image files, emails, etc. In this way, the incoming files can be evaluated using security measures, thus protecting the enterprise system 106 and devices 102 from known or unknown threats. The incoming files can be analyzed by the computerized system 110 and may be returned to the network 104, the internal networks 108 or directly to the devices 102 for entry into the enterprise system 106 or a network system. In some embodiments, the computerized system 110 (or a part thereof) is part of the on premises enterprise system 106 or a regional communication system and may be associated with one or a plurality of such enterprise systems 106, entities or business organizations.

In accordance with the description herein, the various illustrated components of the communication system 100 generally represent appropriate hardware and software components for providing the described resources and performing the described functions. The hardware generally includes any appropriate number and combination of computing devices, network communication devices, and peripheral components connected, including various processors, computer memory (including transitory and non-transitory media), input/output devices, user interface devices, communication adapters, communication channels, etc. The software generally includes any appropriate number and combination of conventional and specially developed software with computer-readable instructions stored by the computer memory in non-transitory computer-readable or machine-readable media and executed by the various processors to perform the functions described herein.

Figure 2:
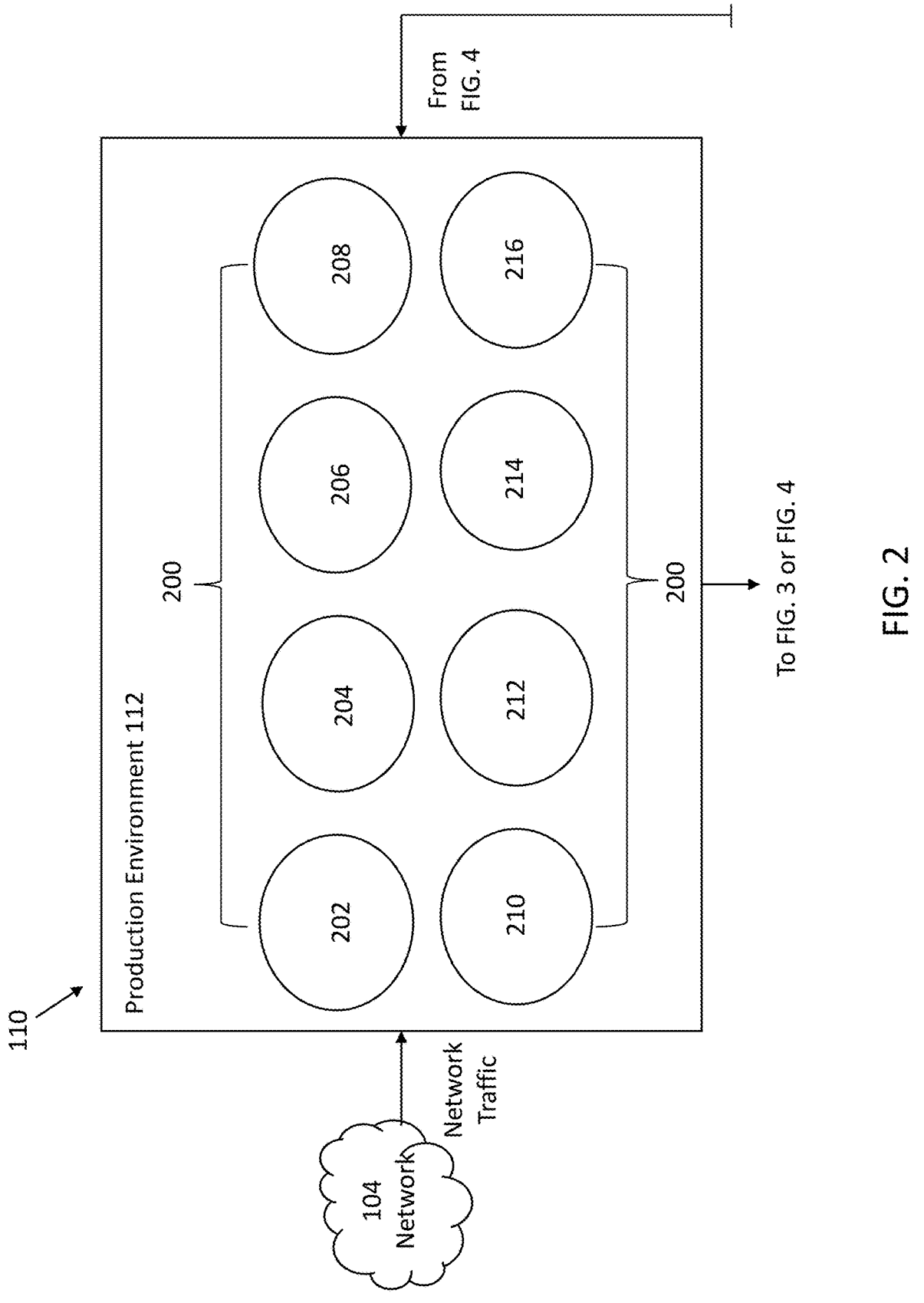
FIG. 2 is a schematic of a plurality of deployed machine learning models of a plurality of detection engines of a computerized system in a production environment, in accordance with some embodiments.

FIG. 2 is a schematic of a plurality of deployed machine learning models of a plurality of detection engines of a computerized system in a production environment, in accordance with some embodiments. The computerized system 110 includes a plurality of detection engines in a production environment 112. Each detection engine of the plurality of detection engines has a trained, deployed machine learning model. In this example, each deployed model may be referred to as 202, 204, 206, 208, 210, 212, 214, 216 . . . n, representing any number of deployed models of the plurality of deployed models 200. In some embodiments, a detection engine may not have a corresponding deployed model or may share a deployed model with another detection engine.

The computerized system 110 is a comprehensive cybersecurity platform for preventing and detecting advanced cybersecurity threats. Malware may sometimes bypass defenses since cybercriminals develop increasingly sophisticated threats. The plurality of detection engines, which may include any number of engines, provide file vulnerability assessments preventing the introduction of unsafe files and binaries ensuring security and minimizing supply chain risks. The plurality of detection engines may process files based on text, artificial intelligence (AI), image detection, static analysis, dynamic analysis, content disarm and reconstruction (CDR), network parameters, cyber threat intelligence, sandboxes, antiviruses, signatures, and/or System and Organization Controls (SOC). Some detection engines are better at identifying threats based on the file type while other detection engines are less successful at identifying the same threat based on that file type. Having a plurality of detection engines, each with a different strength of detection to defend an environment such as the enterprise system 106, reduces the risk of the attack.

Figure 3:
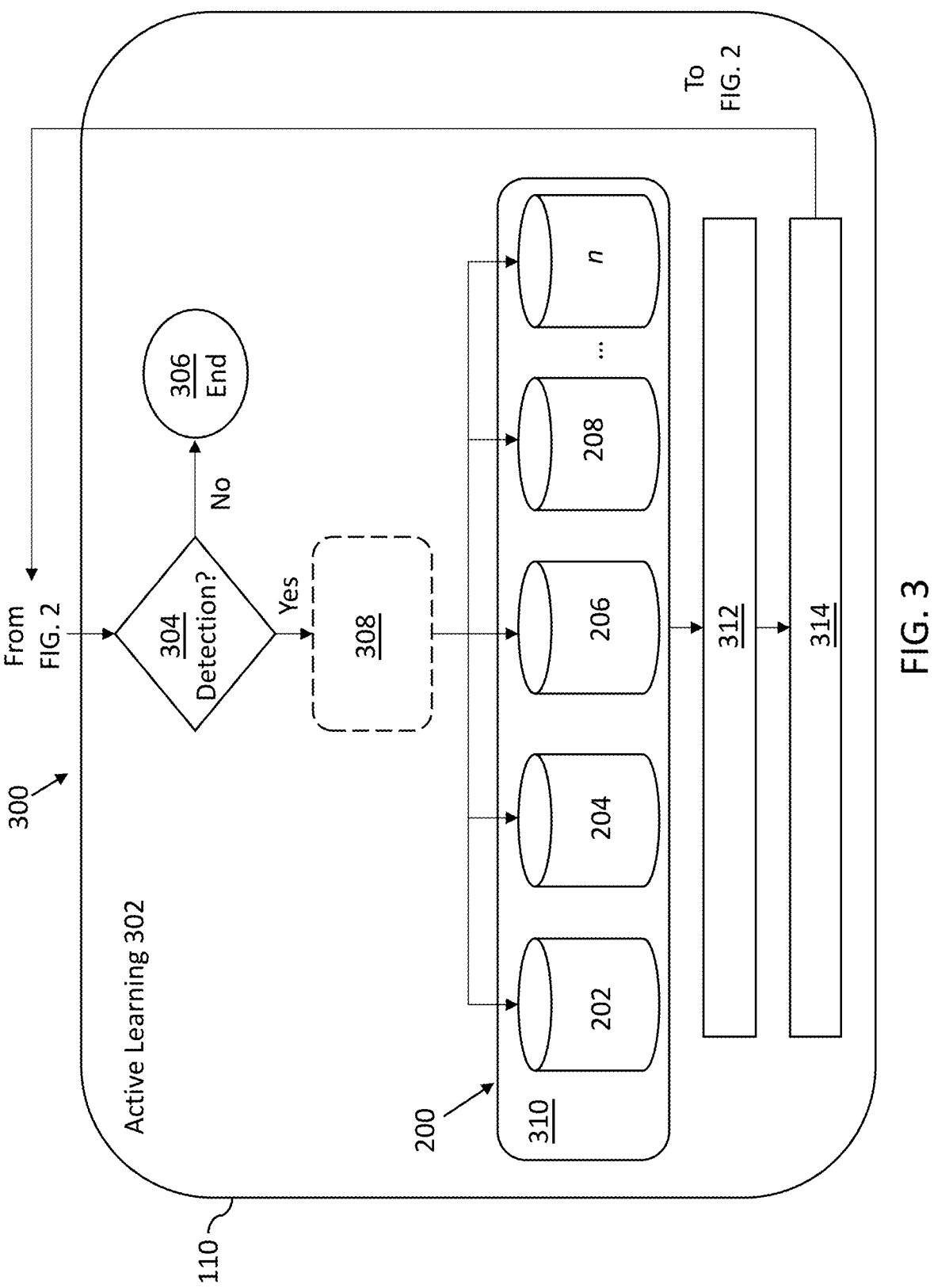
FIG. 3 is a flowchart of a general overview of a method for managing machine learning models of a computerized system, in accordance with some embodiments.

FIG. 3 is a flowchart of a general overview of a method for managing machine learning models of a computerized system, in accordance with some embodiments. FIG. 3 receives input from FIG. 2. Referring to FIG. 2, in practice, network traffic from the network 104, such as a plurality of files, enters the computerized system 110 in the production environment 112. Each deployed model 202, 204, 206, 208, 210, 212, 214, 216 . . . n of the detection engines scrutinizes the plurality of files for malware, threats, attacks or anomalies. Each deployed model 202, 204, 206, 208, 210, 212, 214, 216 . . . n recognizes the file type, the detection machine learning features, and detection signatures. The method 300 for managing machine learning models begins at block 304 of FIG. 3, in active learning 302 where a result is determined for each deployed model 202, 204, 206, 208, 210, 212, 214, 216 . . . n. If no suspicious files are detected, then at block 306 the process ends, and the file is allowed to enter the enterprise system 106. In some embodiments, a reviewer may check a list of approved files from the enterprise system 106 if there are interesting statistical features or indicators of compromise (IOC).

When a suspicious file is detected at block 304, by one or more of plurality of deployed models 200, the computerized system 110 retrains any deployed model that fails to accurately detect the suspicious file. In other words, a deployed model may or may not detect the suspicious file and the result could be an accurate result or an inaccurate result which includes false positives and false negatives. At block 308, there may be an optional review process of the results. This may be a supervised, semi-supervised or automatic review. In some embodiments, a user such as an expert or data scientist may perform the review.

Semi-supervised review means that based on partial insight from the AI, static anti-virus engines, dynamic analysis or detection rules, suggestions for automatic data—file events—review labels are provided for portions of the data. The semi-supervised review may label the events, and based on the AI (see FIG. 4, block 406), additional related events are labeled. The semi-supervised review provides the ability to automatic label more events with a higher probability that those events are similar. By using the semi-supervised review, instead of reviewing, for example, 100 files, the review is scaled up to, for example, 100,000 events. In some embodiments, the labels may be from an AI confidence and model score or other detection mechanisms such as high confidence AI models, signature, static AV, and/or behavioral dynamic detection (e.g., sandbox).

At block 310, the plurality of deployed models 200 that need to be retrained are retrained with new training sets. The new training sets may be based on the result, file type of the suspicious file, deployed model learning features, and signatures. The new training sets are unique to each detection engine and include the data that failed to be detected in block 304. At block 312, a validation process of the plurality of retrained models is performed ensuring that the plurality of retrained models have been retrained. In some embodiments, a verification is also performed to ensure the retrained models meet accuracy metrics per an internal standard. At block 314, the plurality of retrained models is deployed into the production environment 112 thereby replacing the existing plurality of deployed models. This may use a manual review such that the deploying receives input from a manual user review.

Figure 4:
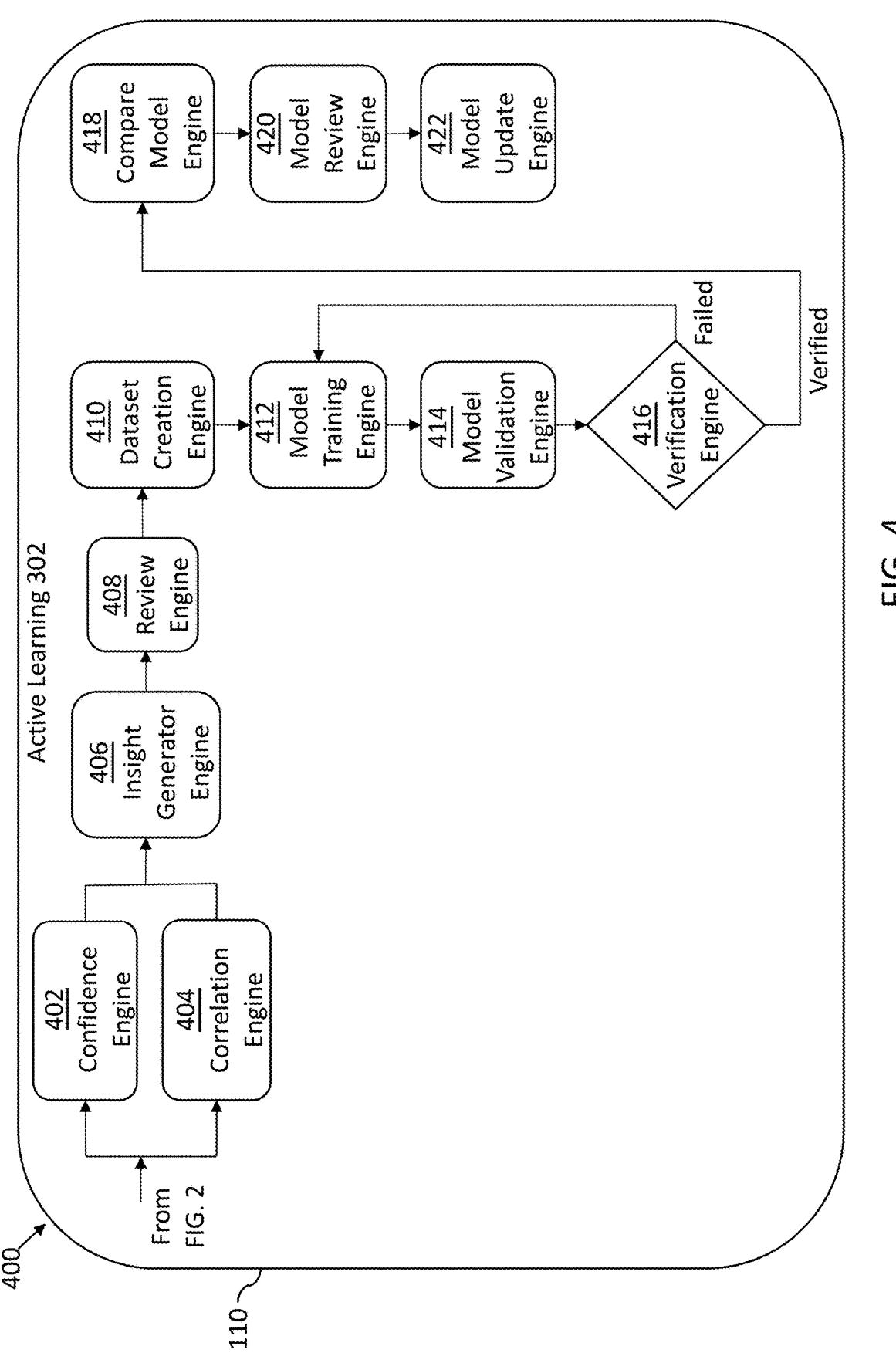
FIG. 4 is a flowchart of a method for managing machine learning models of a computerized system, in accordance with some embodiments.

FIG. 4 is a flowchart of a method for managing machine learning models of a computerized system, in accordance with some embodiments. The method 400 for managing machine learning models begins as described with reference to FIG. 2, with the plurality of detection engines scrutinizing the plurality of files from the network traffic entering the computerized system 110 in the production environment 112 from the network. For example, the plurality of deployed models 200 analyzes the plurality of files to create a plurality of results with corresponding data. The corresponding data includes a file type, deployed model learning features, and detection signatures. Each result of the plurality of results is associated with one deployed model such as 202, 204, 206, 208, 210, 212, 214, 216 . . . n of the plurality of deployed models 200, and each deployed model may have a different result per file type than another deployed model. The plurality of results identifies one or more suspicious files of the plurality of files.

Figure 5:
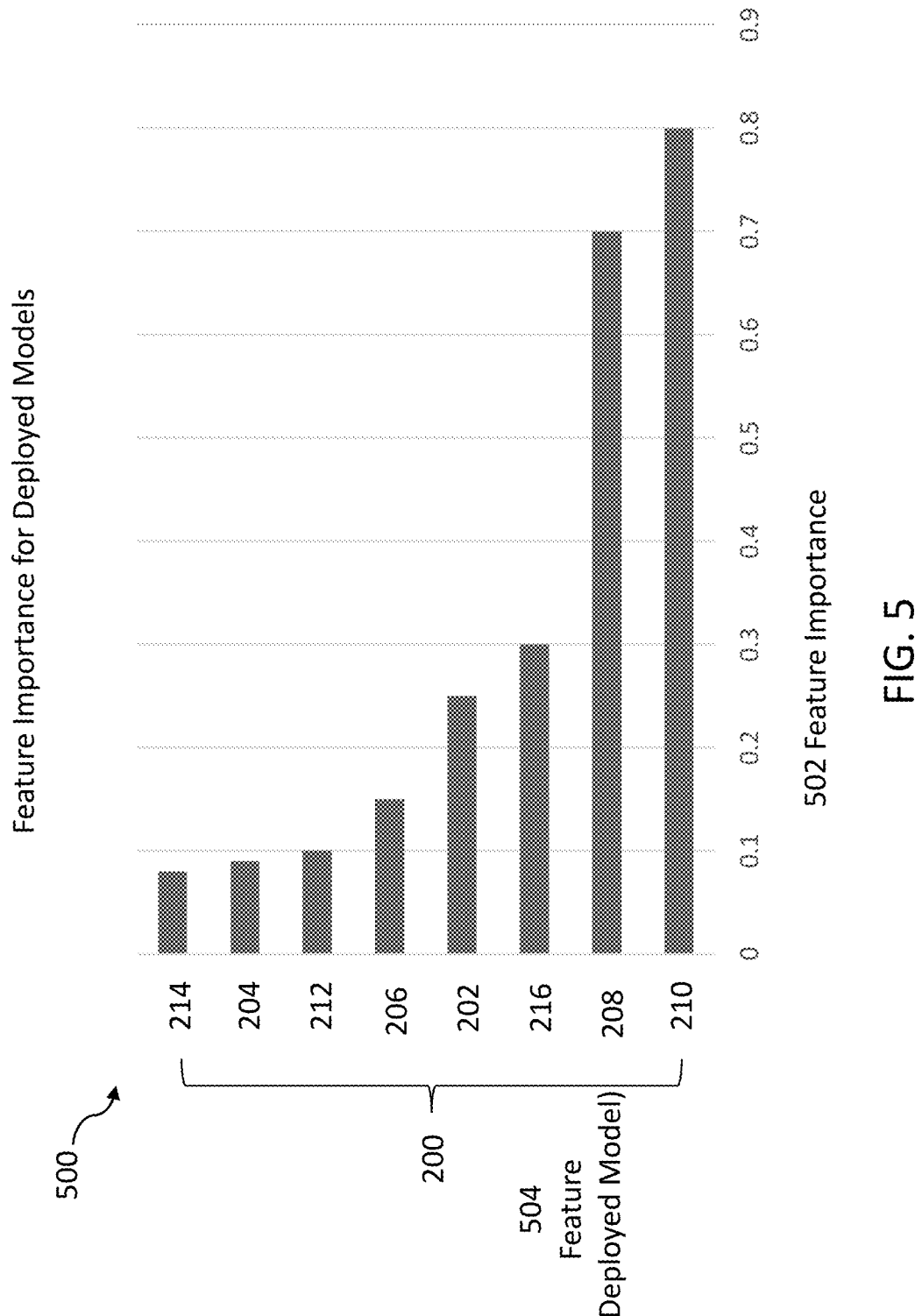
FIG. 5 is a graph of a feature importance for the ranked results of the plurality of deployed models, in accordance with some embodiments, in accordance with some embodiments.

At block 402 of FIG. 4 in active learning 302, a confidence engine of the computerized system 110 calculates ranked results by ranking the plurality of results according to a confidence level. In some embodiments, the outcome of the ranking is a feature importance. FIG. 5 is a graph of a feature importance 500 for the ranked results of the plurality of deployed models 200, in accordance with some embodiments. A feature importance 502 is plotted per feature (e.g., deployed model) 504 which includes deployed models 202, 204, 206, 208, 210, 212, 214, 216 . . . n. The graph of feature importance 500 shows the ranking of each result per detection engine or deployed model such as 202, 204, 206, 208, 210, 212, 214, 216 . . . n. The feature importance 502 shows the confidence that the detection engine—deployed model— has accurate results compared to the other deployed models. Based on the detection engine or the technique of detection and file type, some deployed models may have inaccurate results that includes high false positive rates for a specific file type.

Referring to FIG. 4, block 404 is a correlation engine. The correlation engine calculates the correlation between different kinds of suspicious files that are detected by the computerized system 110 during a time period with similar characteristics. These are grouped into clustered groups by the correlation engine 404. Clustered groups are formed by grouping the plurality of results based on similar data (e.g., file type, deployed model learning features, and signatures) per deployed model 202, 204, 206, 208, 210, 212, 214, 216 . . . n over a time period. During malware attacks, there is typically one attack with many permutations of that attack, and the permutations are similar to one another. The clustered groups are groupings of those suspicious files which are similar In some embodiments, clustering algorithms such as k-means or Density-Based Spatial Clustering of Applications with Noise with Principal Component Analysis (DBScan with PCA) may be used.

The clustering takes the deployed model outcome (e.g., features) and clusters similar files (events) together to group similar files together. The clustering may be used on the model outcome or the raw features of each deployed model or any variation thereof. In some embodiments, the clusters are the events per detection engine, and in other embodiments, the clusters are the events for all of the detection engines.

Figure 6:
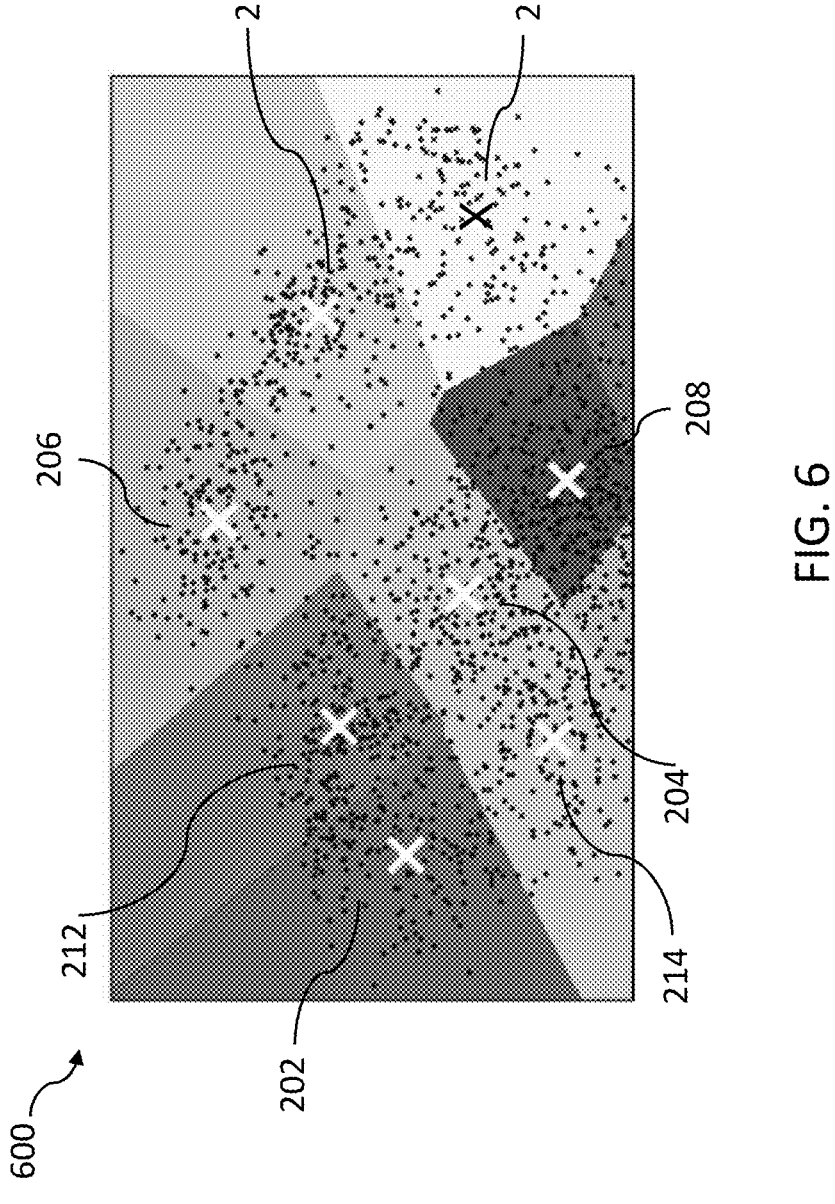
FIG. 6 is a scatter graph of an example of clustered groups per deployed model of the plurality of deployed models, in accordance with some embodiments.

FIG. 6 is a scatter graph 600 of an example of clustered groups per detection engine (e.g., deployed model of the plurality of deployed models 200). The clustered groups are for each deployed model 202, 204, 206, 208, 210, 212, 214, 216 . . . n and different shading is used to indicate the clustered groups. The "x" in each group is the highest concentration or average of suspicious files detected for the particular deployed model. This detects suspicious files that may be related such as a permutation of the same attack.

Referring to FIG. 4, at block 406, an insight generator engine correlates the ranked results from block 402 and FIG. 5 to the clustered groups from block 404 and FIG. 6. The correlation from the insight generator engine is a summary of many suspicious files. A class is calculated from this correlation and the class indicates accurate results and inaccurate results. In some embodiments, the inaccurate results include false positives and false negatives. A false positive is used to indicate a file that is marked as malicious or suspicious, but is in fact not. On the other hand, a false negative is used when a malicious or suspicious file is labeled as secure or clean, and is in fact not. The insight generator engine creates a list of false positives and false negatives and prioritize them for the smart review system.

At block 408, a review engine may be used. In some embodiments, a semi-supervised review process powered by Artificial Intelligence is used. The class by correlation enables the review of a single file or larger groups of files that are very similar and improves the detection of suspicious files. The creation of the classes such as having the prioritized list of false positives and false negatives generator in block 406, is a way to summarize the results of a large number of files, so a reviewer such as a data scientist can review the summary—accurate results and inaccurate results—instead of the large number of files. The reviewer has less to review, thereby saving time, cost and resources, and enabling a scalable review system. Further, the semi-supervised review process powered by Artificial Intelligence improves the process of file-based event review and improves new model training (block 412) and validation (block 414). In some embodiments, the plurality of deployed models 200 may have a low detection rate, or only a small number of the deployed models may recognize the file as suspicious. The insight generator engine helps to decide whether to trust the results of a particular deployed model since the result could be false positives or false negatives.

At block 410, a dataset creation engine creates new training data sets for retraining those models of the plurality of deployed models 200 that need retraining. The plurality of detection engines with their corresponding deployed model uses different perspectives to detect suspicious files so the new training data sets are unique for each detection engine. For example, some detection engines use preview image, some detection engines use only text, and some detection engines use the file itself. In addition to deployed model learning features, the new training sets may be based on the class, file type, and signatures. The prioritized list of false positives and false negatives can be used to create the new training data sets since these are the deployed models that need to be improved.

In some embodiments, the new training data sets are generated automatically or without human interaction. Additionally, the new training data sets include the threats that were just failed to be detected (e.g., deficits) so that the plurality of deployed models is constantly updated in real-time with timely new training data sets including the deficits.

At block 412, a model training engine retrains the plurality of deployed models. In some embodiments, only some of the plurality of deployed models are retrained such as the plurality of deployed models having the class indicating inaccurate results. The new training sets created in block 410 are used for the retraining of the plurality of deployed models. Once the plurality of deployed models are retrained, this creates a plurality of retrained models. In some embodiments, the plurality of deployed models is not retrained when the class indicates accurate results. The retraining may occur on-the-fly as needed, every hour, every few hours, once a day, or any interval of time depending on the application.

At block 414, a model validation engine validates that the plurality of retrained models is retrained. This may be accomplished when the retrained models identify one or more suspicious files of the plurality of files that were originally received from FIG. 2. At block 416, a verification engine performs a verification by using known data sets to verify that the plurality of retrained models meets the accuracy metrics per an internal standard. As described, the plurality of detection engines uses different perspectives to detect suspicious files so each detection engine (e.g., each retrained model) may have a different accuracy for the known training data sets. If the verification fails, meaning the detection of the plurality of retrained models (e.g., plurality of deployed models retrained with the new training data sets) does not meet the accuracy metrics per the internal standard, the method returns to block 412 for further training. The verification may be an automatic process, semi-supervised process, or a manual process.

Once the plurality of retrained models is verified, at block 418, the compare model engine compares the detection or performance of the original plurality of deployed models 200 to the plurality of retrained models. For example, the classes of the plurality of deployed models are compared to new classes of the plurality of retrained models. The new classes of the plurality of retrained models are determined by repeating blocks 402-406 for the plurality of retrained models to generate the new classes. The incoming files entering the computerized system 110 may be known files such as files already known to be suspicious or not suspicious, or new, fresh files not known.

At block 420, the model review engine analyzes the results from block 418 for the model comparison. This may be an automictic process, semi-supervised process, or a manual process. For example, in some embodiments, data scientists may decide to deploy some or all the plurality of retrained models based on the comparison results from block 418 so that the deploying receives input from a manual user review.

At block 422, the model update engine deploys the plurality of retrained models when the new classes of the plurality of retrained models indicate accurate results greater than the classes of the plurality of deployed models. In some embodiments, accuracy metrics per the internal standard is also considered. For example, when the retrained model of the plurality of retrained models performs better at detecting the known suspicious files or new unknown files—based on accurate results and inaccurate results, the retrained model will be deployed instead of the current deployed model. Any number of retrained models are deployed meaning none, some, or all, depending on if there is an improvement over the current deployed models.

The deployment of the retrained models occurs while the plurality of deployed models is deployed in the production environment, which means there is no downtime of the model going offline to be updated. This allows the deployment of the new retrained model to be seamless, on-the-fly, and in real-time with continuous integration and continuous deployment.

Figure 7:
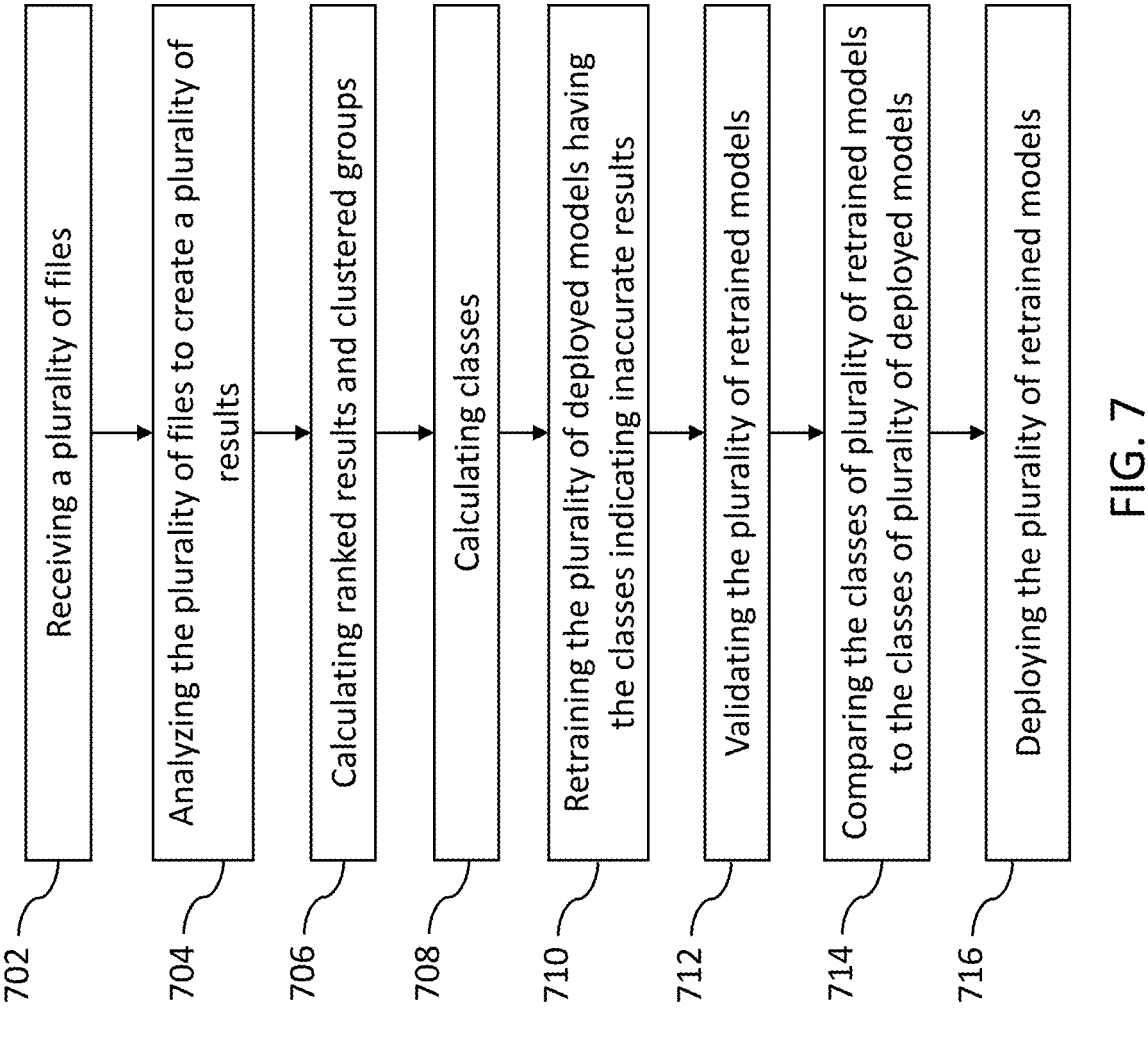
FIG. 7 is a flowchart of an example method for managing machine learning models of a computerized system, in accordance with some embodiments.

FIG. 7 is a flowchart of an example method for managing machine learning models of a computerized system, in accordance with some embodiments. The embodiments have been described in detail with reference to FIGS. 2-6 and will not be discussed in detail herein. At block 702, a plurality of deployed models of a computerized system 110 receives a plurality of files that have been sent to an enterprise system 106 in a communication system 100. At block 704, the plurality of deployed models analyzes the plurality of files to create a plurality of results with corresponding data. Each result of the plurality of results is associated with one deployed model of the plurality of deployed models. The plurality of results identifies one or more suspicious files of the plurality of files. At block 706, the computerized system 110 calculates ranked results by ranking the plurality of results according to a confidence level and produces clustered groups by clustering the plurality of results based on similar data. At block 708, the computerized system 110 calculates classes by correlating the ranked results to the clustered groups. The classes indicate accurate results and inaccurate results.

At block 710, the computerized system 110 retrains the plurality of deployed models having the classes indicating inaccurate results with new training sets to create a plurality of retrained models. The new training sets are based on the classes and the corresponding data. At block 712, the computerized system 110 validates the plurality of retrained models have been retrained when the retrained models identify one or more suspicious files of the plurality of files from the receiving. At block 714, the computerized system 110 compares the classes of the plurality of deployed models to new classes of the plurality of retrained models. The new classes are determined by repeating the receiving, analyzing, and calculating for the plurality of retrained models. At block 716, the computerized system 110 deploys the plurality of retrained models when the new classes of the plurality of retrained models indicate accurate results greater than the classes of the plurality of deployed models.

In some embodiments, there may be two deployed models. FIG. 8 is a flowchart of an example method for managing two machine learning models of a computerized system, in accordance with some embodiments. The method 800 for managing two machine learning models starts at block 802, where a first deployed model and a second deployed model of a computerized system 110 receive a file sent to an enterprise system 106 in a communication system 100. In this example, for clarity, the second deployed model will be retained at block 810. At block 804, the first deployed model and the second deployed model analyze the file to create a first result with first corresponding data associated with the first deployed model and a second result with second corresponding data associated with the second deployed model. The first result or the second result identifies the file as a suspicious file. At block 806, the computerized system 110 calculates ranked results by ranking the first result and the second result according to a confidence level. At block 808, the computerized system 110 calculates a first class associated with the first result and a second class associated with the second result. The first class indicates an accurate result and the second class indicates an inaccurate result.

At block 810, the computerized system 110 retrains the second deployed model having the second class indicating inaccurate results with new training sets to create a second retrained model. The new training sets are based on the second class and the second corresponding data. At block 812, the computerized system 110 validates the second retrained model has been retrained when the second retrained model identifies the suspicious file from the receiving. At block 814, the computerized system 110 compares the first class of the first deployed model to a new second class of the second retrained model. The new second class is determined by repeating the receiving, analyzing, and calculating for the second retrained model. At block 816, the computerized system 110 deploys the second retrained model when the new second class of the second retrained model indicates the accurate result greater than the first class of the first deployed model.

Figure 9:
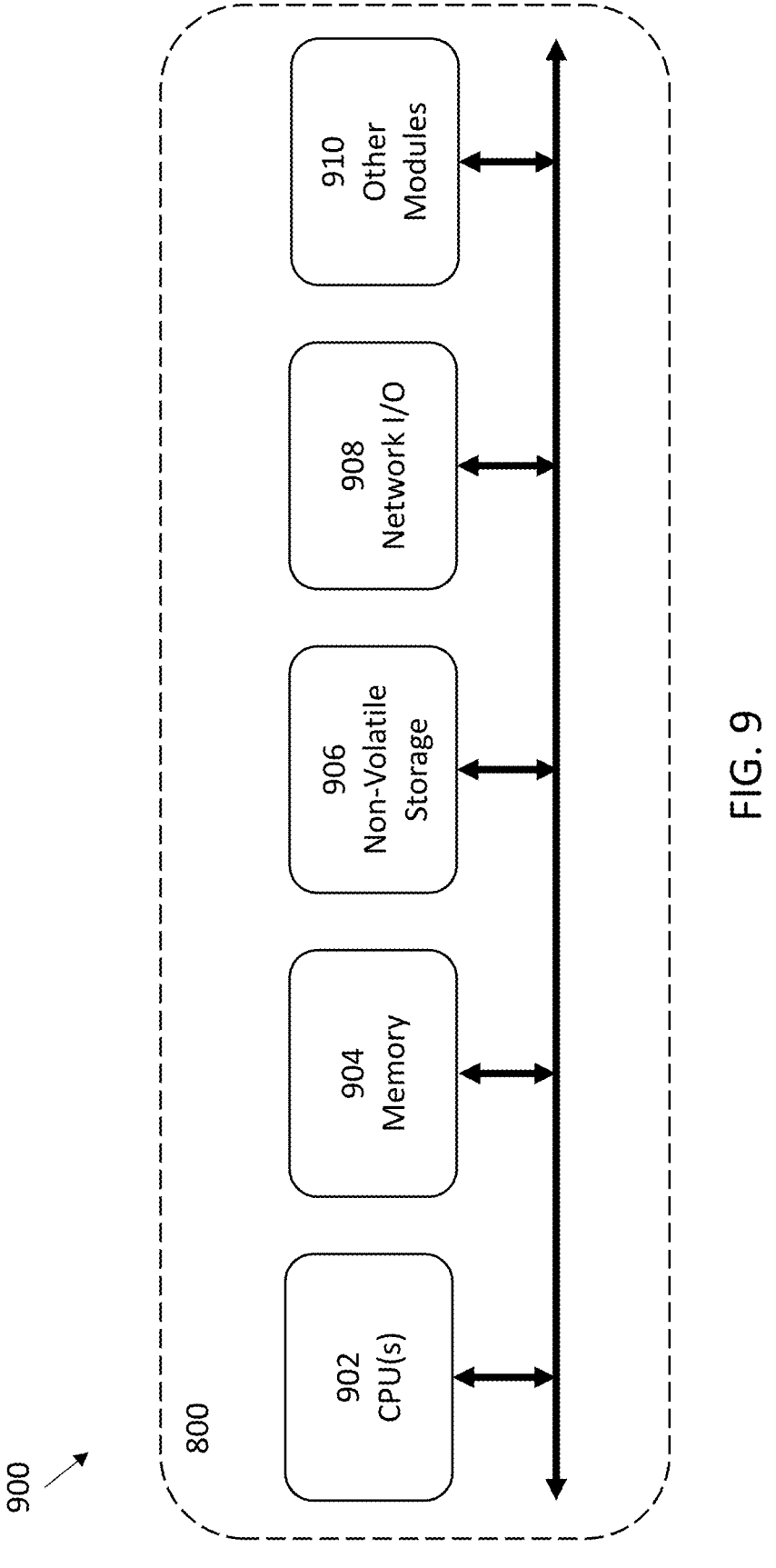
FIG. 9 illustrates an example compute node which could be used as a hardware platform for implementing all or a portion of each of the computerized system and the devices, in accordance with some embodiments.

FIG. 9 illustrates an example compute node 900 which could be used as a hardware platform for implementing all or a portion of each of the computerized system 110, in accordance with some embodiments. The compute node 900 generally includes one or more CPUs 902, a memory module 904 (e.g., RAM), a non-volatile data storage module 906 (e.g., a hard-drive/disk-drive or array of hard-drives/disk-drives), a network I/O module 908 (e.g., a network interface card (NIC) and/or a top-of-rack interface), and other modules 910 such as user I/O, wireless communication modules, optical communication modules, system diagnostic or monitoring modules, or other modules. The other modules may include the engines described in FIG. 4 such as the confidence engine (block 402), the correlation engine (block 404), the insight generator engine (block 406), the review engine (block 408), the dataset creation engine (block 410), the model training engine (block 412), the model validation engine (block 414), the verification engine (block 416), the compare model engine (block 418), the model review engine (block 420) and the model update engine (block 422).

The CPUs 902 are operable to perform processes in association with the memory module 904 and the non-volatile data storage module 906. In some embodiments, one or more compute nodes 900 are configured to perform all or a portion of the methods 300, 400, 700, and/or 800 disclosed herein. In such embodiments, the memory module 904 and the non-volatile data storage module 906 may include all, or a portion of the programs and data required by the CPUs 902 to perform the methods 300, 400, 700, and/or 800 disclosed herein. For example, in some embodiments, a computerized system 110 includes a memory 904 for storing executable instructions and a processor (e.g., CPU) 902. The processor 902 is coupled to the memory 904 that performs a method by executing the instructions stored in the memory 904. The method may be method 300, 400, 700 or 800 as described herein.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method comprising:

receiving, by a plurality of deployed models of a computerized system, a plurality of files to an enterprise system in a communication system, each deployed model configured to analyze the plurality of files from a different perspective;

analyzing, in parallel and independently, by the plurality of deployed models, the plurality of files to create a plurality of results with corresponding data, each result of the plurality of results is associated with a respective deployed model of the plurality of deployed models, wherein the plurality of results identifies one or more suspicious files of the plurality of files;

calculating, by the computerized system, ranked results by ranking the plurality of results according to a confidence level, and clustered groups by clustering the plurality of results based on similar data;

calculating, by the computerized system, classes by correlating the ranked results to the clustered groups, wherein the classes indicate accurate results and inaccurate results;

retraining, by the computerized system, the plurality of deployed models having the classes indicating the inaccurate results with new training sets to create a plurality of retrained models, the new training sets based on the classes and the corresponding data;

validating, by the computerized system, the plurality of retrained models have been retrained when the plurality of retrained models identify the one or more suspicious files of the plurality of files from the receiving;

comparing, by the computerized system, the classes of the plurality of deployed models to new classes of the plurality of retrained models, the new classes determined by repeating the receiving, analyzing, and calculating for the plurality of retrained models; and deploying, by the computerized system, the plurality of retrained models when the new classes of the plurality of retrained models indicate accurate results greater than the classes of the plurality of deployed models.

2. The method of claim 1, wherein the corresponding data comprises a file type, deployed model learning features, and signatures.

3. The method of claim 1, wherein the inaccurate results include false positives and false negatives.

4. The method of claim 1, wherein the correlating the ranked results to the clustered groups uses a semi-supervised review process powered by Artificial Intelligence.

5. The method of claim 1, wherein the clustering the plurality of results is over a time period.

6. The method of claim 1, wherein the deployed model of the plurality of deployed models is not retrained when the classes indicate accurate results.

7. The method of claim 1, wherein the method occurs while the plurality of deployed models is deployed.

8. The method of claim 1, wherein the deploying receives input from a manual user review.

9. A computerized system comprising:

a memory storing executable instructions; and a processor, coupled to the memory, that performs a method by executing the instructions stored in the memory, the method comprising:

receiving, by a plurality of deployed models of the computerized system, a plurality of files to an enterprise system in a communication system, each deployed model configured to analyze the plurality of files from a different perspective;

analyzing, in parallel and independently, by the plurality of deployed models, the plurality of files to create a plurality of results with corresponding data, each result of the plurality of results is associated with a respective deployed model of the plurality of deployed models, wherein the plurality of results identifies one or more suspicious files of the plurality of files;

calculating, by the processor, ranked results by ranking the plurality of results according to a confidence level, and clustered groups by clustering the plurality of results based on similar data;

calculating, by the processor, classes by correlating the ranked results to the clustered groups, wherein the classes indicate accurate results and inaccurate results;

retraining, by the processor, the plurality of deployed models having the classes indicating the inaccurate results with new training sets to create a plurality of retrained models, the new training sets based on the classes and the corresponding data;

validating, by the processor, the plurality of retrained models have been retrained when the plurality of retrained models identify the one or more suspicious files of the plurality of files from the receiving;

comparing, by the processor, the classes of the plurality of deployed models to new classes of the plurality of retrained models, the new classes determined by repeating the receiving, analyzing, and calculating for the plurality of retrained models; and deploying, by the processor, the plurality of retrained models when the new classes of the plurality of retrained models indicate accurate results greater than the classes of the plurality of deployed models.

10. The computerized system of claim 9, wherein the corresponding data comprises a file type, deployed model learning features, and signatures.

11. The computerized system of claim 9, wherein the inaccurate results include false positives and false negatives.

12. The computerized system of claim 9, wherein the correlating the ranked results to the clustered groups uses a semi-supervised review process powered by Artificial Intelligence.

13. The computerized system of claim 9, wherein the clustering the plurality of results is over a time period.

14. The computerized system of claim 9, wherein the deployed model of the plurality of deployed models is not retrained when the classes indicate accurate results.

15. The computerized system of claim 9, wherein the method occurs while the plurality of deployed models is deployed.

16. The computerized system of claim 9, wherein the deploying receives input from a manual user review.

17. A method comprising:

receiving, by a first deployed model and a second deployed model of a computerized system, a file to an enterprise system in a communication system, the first deployed model and the second deployed model configured to analyze a plurality of files from a different perspective;

analyzing, in parallel and independently, by the first deployed model and the second deployed model, the file to create a first result with first corresponding data associated with the first deployed model and a second result with second corresponding data associated with the second deployed model, wherein the first result or the second result identifies the file as a suspicious file;

calculating, by the computerized system, ranked results by ranking the first result and the second result according to a confidence level;

calculating, by the computerized system, a first class associated with the first result and a second class associated with the second result, wherein the first class indicates an accurate result and the second class indicates an inaccurate result;

retraining, by the computerized system, the second deployed model having the second class indicating the inaccurate results with new training sets to create a second retrained model, the new training sets based on the second class and the corresponding data;

validating, by the computerized system, the second retrained model has been retrained when the second retrained model identifies the suspicious file from the receiving;

comparing, by the computerized system, the first class of the first deployed model to a new second class of the second retrained model, the new second class determined by repeating the receiving, analyzing, and calculating for the second retrained model; and deploying, by the computerized system, the second retrained model when the new second class of the second retrained model indicates the accurate result greater than the first class of the first deployed model.

18. The method of claim 17, wherein the first corresponding data and the second corresponding data comprises a file type, deployed model learning features, and signatures.

19. The method of claim 17, wherein the inaccurate results include false positives and false negatives.

20. The method of claim 17, wherein the method occurs while the first deployed model and the second deployed model are deployed.

* * * * *